United States Patent [19]

Maehara

[11] Patent Number: 4,844,555
[45] Date of Patent: Jul. 4, 1989

[54] ANTI-LOCK CONTROL DEVICE IN A 2-CHANNEL DIAGONAL BRAKE SYSTEM

[75] Inventor: Toshifumi Maehara, Hanazono, Japan

[73] Assignees: Akebono Brake Industry Co., Ltd.; Akebono Research and Development Centre Ltd., both of Japan

[21] Appl. No.: 284,435

[22] Filed: Dec. 14, 1988

[30] Foreign Application Priority Data

Dec. 29, 1987 [JP] Japan .................................. 62-336404

[51] Int. Cl.$^4$ .............................................. B60T 17/18
[52] U.S. Cl. ........................................ 303/92; 303/111
[58] Field of Search ................. 303/92, 106, 110, 111, 303/112, 114, 116, 119

[56] References Cited

U.S. PATENT DOCUMENTS

| 4,229,049 | 10/1980 | Ando .................................. 303/92 X |
| 4,676,558 | 6/1987 | Klein ................................. 303/92 X |
| 4,720,151 | 1/1988 | Belart et al. ....................... 303/92 X |
| 4,744,610 | 5/1988 | Arikawa ............................. 303/92 |

Primary Examiner—Duane A. Reger
Attorney, Agent, or Firm—Oliff & Berridge

[57] ABSTRACT

An anti-lock control device in a 2-channel diagonal brake composed of two individual brake lines, one controlling the front left and the rear right wheel, and the other the front right and the rear left wheel. When pressure reduction occurs in one brake line during anti-lock control, a cut valve closes the brake fluid passage to the rear wheel in the other brake line so as to retain the fluid pressure of the rear wheel at a constant value. Further, when one brake line fails to function, the cut valve for opening and closing the brake fluid passage to the rear wheel in the other brake line is put in a normally open condition.

6 Claims, 4 Drawing Sheets

ANTI-LOCK CONTROL DEVICE IN A 2-CHANNEL DIAGONAL BRAKE SYSTEM

BACKGROUND OF THE INVENTION

This invention relates to an anti-lock control device in a 2-channel diagonal brake system.

U.S. Pat. No. 4,744,610 discloses a conventional anti-lock control device of this type.

As shown in FIG. 3, this conventional device comprises a first brake fluid pressure control valve 53a arranged between a first fluid pressure generating chamber 51a of a master cylinder 50 and a front left wheel cylinder 52a, a second fluid pressure control valve 53b arranged between a second fluid pressure generating chamber 51b of the master cylinder 50 and a front right wheel cylinder 52b, a control unit 54 adapted to assess the wheel skid condition and to issue the command for controlling said first and second brake fluid pressure control valves 53a and 53b, and a pressure selecting means 55 adapted to output a pressure corresponding to the lower one of the brake fluid pressures in the left and right front wheels controlled by said first and second brake fluid pressure control valves 53a and 53b.

Said pressure selecting means is provided between the front left wheel FL and the rear right wheel RR, and between the front right wheel FR and the rear left wheel RL, and has a pair of valve elements 56a and 56b for opening and closing the passages between these wheels as well as a pair of coupled pistons 57a and 57b adapted to receive the fluid pressure of the first and second fluid pressure generating chambers 51a and 51b of said master cylinder 50 and that of the wheel cylinders 52a and 52b of said left and right front wheels, respectively, in diagonal directions.

These pistons 57a and 57b are normally in a neutral position, keeping both of said pair of valve elements 56a and 56b in an open state. When one of the brake lines, for example, the line FL-RR, is put in an anti-lock control state and the fluid pressure of the front left wheel cylinder 52a is reduced, the pistons 57a and 57b move according to the pressure reduction, also reducing the fluid pressure of the rear right wheel cylinder 58i a, with the valve element 56a of the one brake line being kept open.

The movement of these pistons 57a and 57b results in the volume of a chamber 59b defined between the valve element 56b and the piston 57b being enlarged, which chamber absorbs the brake fluid pressure of the rear left wheel cylinder 58b in the other brake line (FR-RL).

When one of the brake lines, for example, the line FL-RR fails to operate, the pistons 57a and 57b are either moved toward the position in which the valve element 56b of the other valve line is forced to open, or held in a position in which both of said pair of valve elements 56a and 56b are kept in the open state.

When in such a conventional device, pressure reduction is alternately effected in both brake lines, the vehicle wheels will exhibit the brake fluid pressure characteristics shown in FIG. 4. The fluid pressures of the rear wheels are balanced to the lower one, the fluid pressure of the rear wheel which needs no anti-lock control is also reduced. This results in a reduced rear-wheel braking force, and accordingly a braking distance rather too long.

SUMMARY OF THE INVENTION

It is accordingly an object of this invention to provide an anti-lock control device for a 2-channel diagonal brake system which does not involve any pressure reduction in the brake fluid of the rear wheel in the other brake line which needs no anti-lock control while performing anti-lock control of one of the brake lines, thereby retaining a constant braking force.

It is another object of this invention to provide an anti-lock control device equipped with a fail-safe function so that if one of the brake lines fails to operate, the other line may function normally.

In order to attain these objects, the following measure has been taken in a 2-channel diagonal brake system of the type in which the brake fluid pressure from the master cylinder is supplied individually to the FL-RR line for controlling the brake fluid pressure of the front left wheel and the rear right wheel and to the FR-RL line for controlling that of the front right wheel and the rear left wheel:

In accordance with this invention, each of the two brake lines is equipped with a reservoir adapted to reduce the brake fluid pressure from both the front and rear wheels when either the front or the rear wheel threatens to start locking.

Further, each of the brake lines is equipped with a cut valve which functions such that when one of the brake lines is subjected to anti-lock control, resulting in pressure reduction of the line concerned, it keeps the rear wheel brake fluid pressure in the other brake line at a certain value at the time of said pressure reduction.

It can happen that, while this cut valve retains the rear wheel brake fluid pressure in the other brake line at a certain value, the other brake line is also subjected to anti-lock control, so that it becomes necessary to reduce the rear wheel brake fluid pressure which is being retained by the cut valve in the other brake line. In view of this, a check valve for reducing the rear wheel brake fluid pressure is provided in each of the brake lines.

Further, a fail-safe function can be obtained by providing a fail-safe control device which puts the cut valve in one of the brake lines in a normally open state when the other brake lines fails to operate.

In normal operation, the fluid pressure from the master cylinder is supplied to the front right wheel and the front left wheel, and, at the same time, to the rear left wheel and the rear right wheel, through the passages of the cut valves.

When, for example, the wheels in the FL-RR line are decelerated and the brake fluid pressure of the FL-RR line is relieved into the reservoir, the passage to the RL is interrupted to retain the fluid pressure, with exclusively the FR being pressurized. When in this condition the wheels in the FR-RL line ar also decelerated to be subjected to anti-lock control and the brake fluid pressure in the FR-RL line is relieved into the reservoir. The fluid pressure of the RL (rear left wheel) is reduced according to the need by the check valve, in accordance with the deceleration of the FR (front right wheel).

When, for example, the FL-RR line fails to operate, the fail-safe piston is moved to the right due to the absence of the fluid pressure on the right-hand side, so that the cut valve 7b of the FR-RL line is kept in the open state, thereby allowing the FR-RL line to operate normally.

DESCRIPTION OF THE PREFERRED EMBODIMENT

Figure 1:
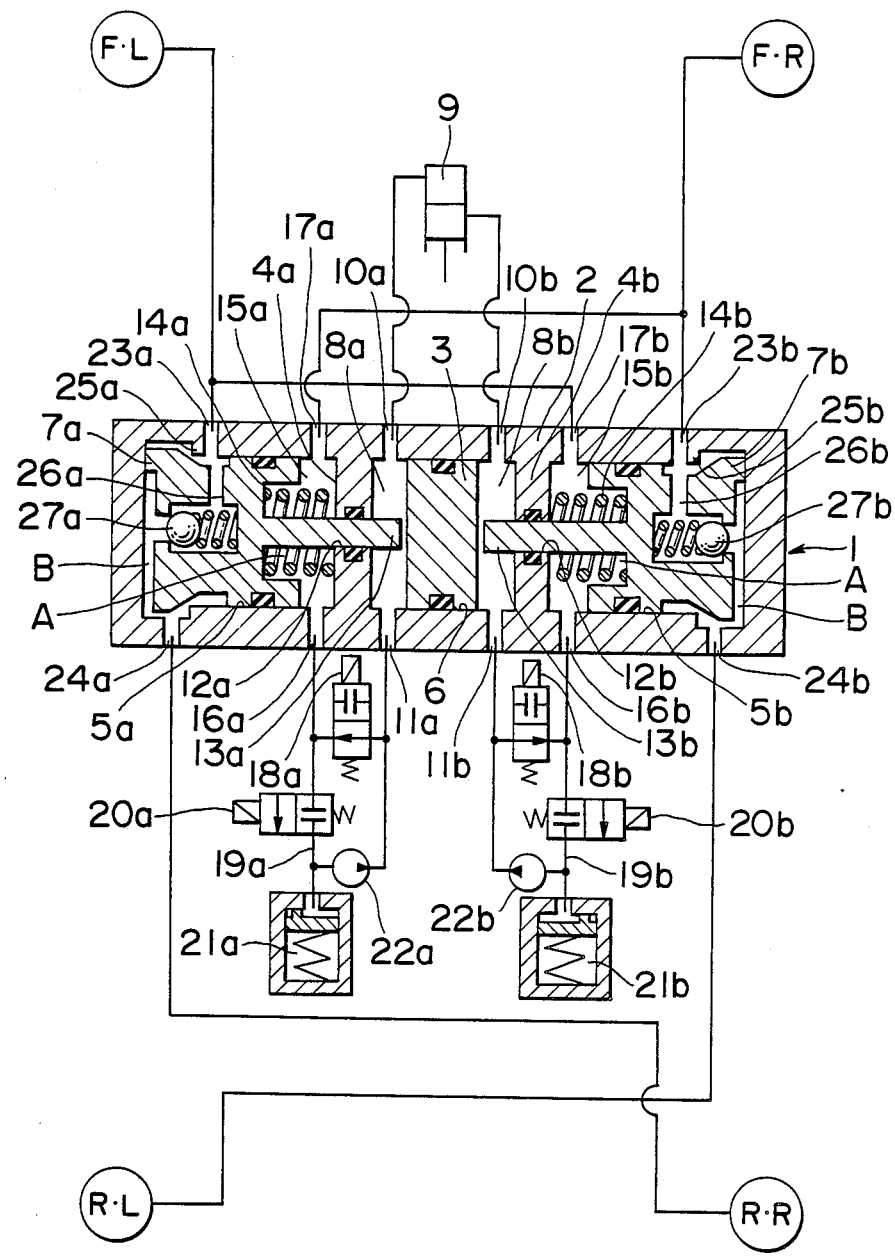
FIG. 1 is a fluid pressure line diagram showing an embodiment of this invention.

A preferred embodiment of this invention will now be described with reference to FIGS. 1 and 2.

This device is constructed with a control valve 1 at its center. The control valve 1 includes a body 2 and a fail-safe piston 3 slidably provided in the central portion thereof, the entire valve 1 having a bisymmetrical structure with the fail-safe piston 3 at its center.

To schematically describe the control valve 1, it includes a pair of cut valves 7a, 7b which are symmetrically arranged with respect to the fail-safe piston 3. Provided on either side of the fail-safe piston 3 are fluid pressure input chambers 8a, 8b. Each of the cut valves 7a, 7b are equipped with a first fluid passage A and a second fluid passage B which pass through themselves. The cut valves 7a, 7b are so constructed that they open and close the respective second fluid passages B, and are equipped with respective butting bars 13a and 13b which are to abut against the fail-safe piston 3.

FIG. 1 also shows a master cylinder 9 of a tandem type. One of the fluid pressure generating chambers of the master cylinder 9 is connected through said fluid pressure input chamber 8a and said first fluid passage A of the cut valve 7a to the front wheel cylinder of one brake line FR-RL. It is further connected, after passing through the first fluid passage A of the cut valve 7a, to the rear wheel cylinder of the other brake line, through the second fluid passage B of the other cut valve 7b. Further, a first reservoir 21 is connected through the first fluid passage A of the cut valve 7a to the front wheel cylinder of the brake line FR-RL. The first reservoir 21 is also connected through the second fluid passage B of the other cut valve 7b to the rear wheel cylinder of the brake line FR-RL.

The other fluid pressure generating chamber of the master cylinder 9 is connected through said fluid pressure input chamber 8b and the first fluid passage A of the other cut valve 7b to the front wheel cylinder of the other brake line FL-RR. It is also connected, after passing through the first fluid passage A of the other cut valve 7b, to the rear wheel cylinder of the other brake line FL-RR through the second fluid passage B of the cut valve 7a. Further, a second reservoir 21b is connected through the first fluid passage A of the other cut valve 7b to the front wheel cylinder of the other brake line FL-RR It is further connected through the first fluid passage A of the other cut valve 7b and the second fluid passage B of the cut valve 7a to the rear wheel cylinder of the other brake line FL-RR.

When the brake fluid is absorbed by the first reservoir 21a, the cut valve 7a closes the second fluid passage B thereof, and, when the brake fluid is absorbed by the second reservoir 21b, the other cut valve 7b closes the second fluid passage B thereof.

Further, check valves 27a, 27b are provided in the respective second fluid passages B of the cut valves 7a, 7b, in such a manner that the fluid is allowed to flow from the rear wheel cylinders to the master cylinder 9.

Each of the cut valves 7a, 7b consists of a stepped piston which is moved by the fluid pressure in the second fluid passage B to interrupt the second fluid passage B when the fluid pressure in the first fluid passage A is reduced during anti-lock control, and is normally urged by a spring 14a, 14b toward the position in which the second fluid passage B is opened.

The device will now be described in more detail.

The cylinder body 2 is divided by two partition walls 4a, 4b into a left valve chamber 5a, a central piston chamber 6, and a right valve chamber 5b, said fail-safe piston being slidably arranged in the central piston chamber 6, and the piston-like cut valves 7a, 7b being slidably provided in the respective valve chambers 5a and 5b.

The central piston chamber 6 is divided into two portions by the fail-safe piston 3, the left portion serving as the fluid pressure input chamber 8a for the FR-RL line, and the right portion serving as the fluid pressure input chamber 8b for the FL-RR line. The cylinder body 2 includes input ports 10a, 10b which connect these fluid pressure input chambers 8a, 8b to the master cylinder 9, and first communication ports 11a, 11b which serve to output the input fluid pressure.

Provided respectively in the center of the partition walls 4a, 4b are through-holes 12a, 12b, through which butting bars 13a, 13b protruding from the respective cut valves 7a, 7b pass fluid-tight and slidably. Further, springs 14a, 14b are provided in the respective portions between the partition walls 4a, 4b and the cut valves 7a, 7b, thereby urging the left cut valve 7a to the left and the right cut valve 7b to the right.

The cylinder-body 2 further includes second communication ports 16a, 16b which are connected to said first communication ports 11a, 11b and which communicate with chambers 15a, 15b defined between the partition walls 4a, 4b and the cut valves 7a, 7b, and first output ports 17a, 17b for outputting the brake fluid pressure which has passed through the chambers 15a, 15b defined between the partition walls 4a, 4b and the cut valves 7a, 7b. Said first fluid passage A is formed by the second communication port 16a, the chamber 15a and the first output port 17a, or by the second communication port 16b, the chamber 15b and the cut valve 7b.

Provided between said first communication ports 11a, 11b and said second communication ports 16a, 16b are hold valves 18a, 18b which allow the pressure fluid to flow from the first communication ports 11a, 11b to the second communication ports 16a, 16b. Pressure-reducing fluid passages 19a, 19b are arranged in parallel to the hold valves 18a, 18b. Connected to these pressure-reducing fluid passages 19a, 19b are decay valves 20a, 20b, reservoirs 21a, 21b and pumps 22a, 22b. The decay valves 20a, 20b are arranged in such a manner as to allow the pressure fluid to flow from the side of the second communication ports 16a, 16b to that of the first communication ports 11a, 11b.

The left-hand first output port 17a is connected to the FR wheel cylinder, and the right-hand first output port 17b to the FL wheel cylinder.

Further, the cylinder body 2 includes third communication ports 23a, 23b and second output ports 24a, 24b. These portions of the cylinder inner surface which are between the third communication ports 23a, 23b and the second output ports 24a, 24b are formed as stepped valve seats 25a, 25b. When the cut valves 7a, 7b move toward the partition walls 4a, 4b, the peripheral surfaces of the cut valves 7a, 7b come into contact with these valve seats 25a, 25b, thereby interrupting the communication between the third communication ports 23a, 23b and the second output ports, i.e., RR, RL.

The cut valves 7a, 7b include by-pass passages 26a, 26b connecting the third communication ports 23a, 23b to the second output ports 24a, 24b. Said second fluid passage B is formed by the third communication port 23a, the by-pass passage 26a and the second output port 24a, or by the third communication port 23b, the by-pass passage 26b and the second output port 24b. Provided in these by-pass passages 26a, 26b are check valves 27a, 27b allowing the pressure fluid to flow from the second output ports 24a, 24b to the third communication ports 23a, 23b. The left-hand third communication port 23a is connected to the right-hand first output port 17b, and the right-hand third communication port 23b to the left-hand first output port 17b. The left-hand second output port 24a is connected to the RR-wheel cylinder, and the right-hand second output port 24b to the RL-wheel cylinder.

Apart from the above, a microcomputer (ECU) which is not shown in the drawings is provided in this device. Connected to the ECU are sensors for detecting the respective rotating speeds of whole wheels. The ECU judges any danger of wheel-locking by detection signals transmitted from the sensors. Said hold valves 18a, 18b and said decay valves 20a, 20b are connected to the ECU, and are opened or closed in accordance with a signal from the ECU. The device in accordance with this invention adopts what is called a select-low-type anti-lock control device. In other words, when, in the FL-RR or the FR-RL line, either FL or RR, or either FR or RL threatens to start locking, the line concerned is subjected to anti-lock control.

The operation of the embodiment will now be described.

In normal brake control, the fluid pressure generated in the master cylinder 9 by applying pushing force to the brake pedal, is transmitted to the fluid pressure input chambers 8a, 8b on either side of the fail-safe piston 3, and is supplied, through the first communication ports 11a, 11b, the hold valves 18a, 18b, the second communication ports 16a, 16b, the spring side chambers 15a, 15b of the cut valves 7a, 7b, and the first output ports 17a, 17b, to the FR and FL, and is further supplied through the passages of the cut valves 7a, 7b to the RL and RR.

Suppose a vehicle equipped with the device is now approaching a road surface whose friction coefficient μ on the left-hand side thereof is different from that on the right-hand side.

When the friction coefficient μ on the left-hand side of the road surface is lower than that on the right-hand thereof, there is a danger of starting locking of the FL in the FL-RR line. In this case, a signal from the ECU causes the hold valve 18b to be closed and the decay valve 20b to be opened, so that the fluid pressure in the chamber 15b between the cut valve 7b and the partition wall 4b is relieved into the reservoir 21b, thereby reducing the fluid pressure of FL and RR (a-b in FIG. 2).

Figure 2:
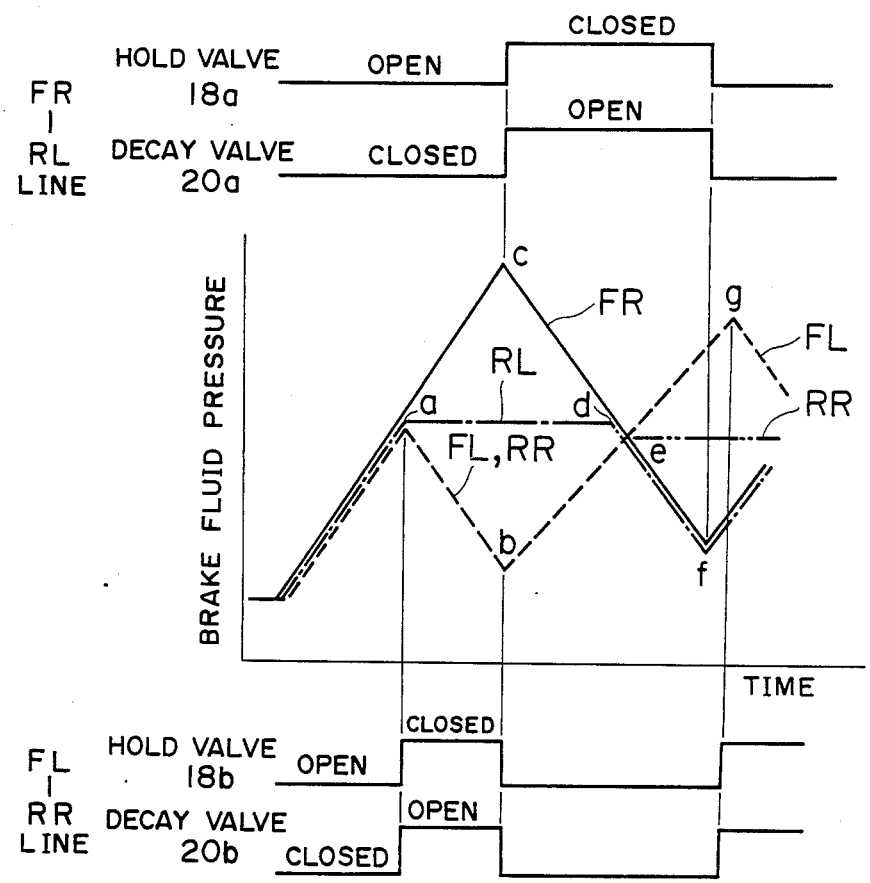
FIG. 2 is a graph showing an example of the fluid pressure condition during the operation thereof.
Figure 3:
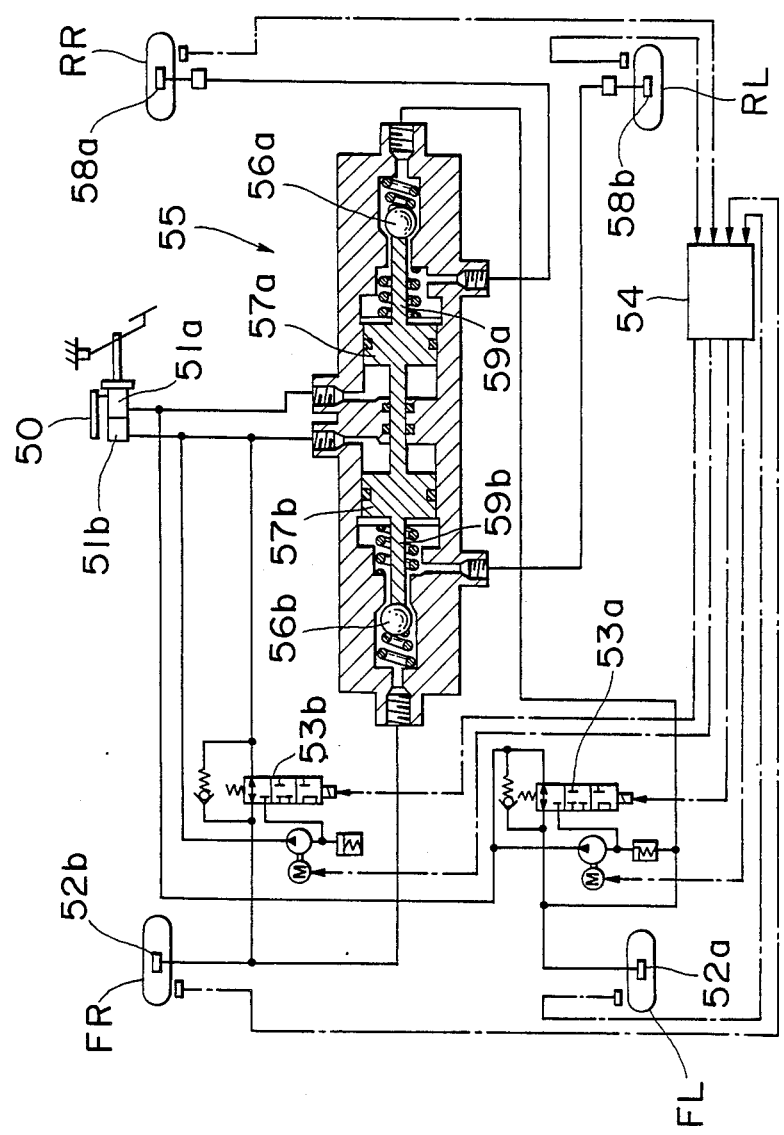
FIG. 3 is a fluid pressure line diagram showing a conventional device.
Figure 4:
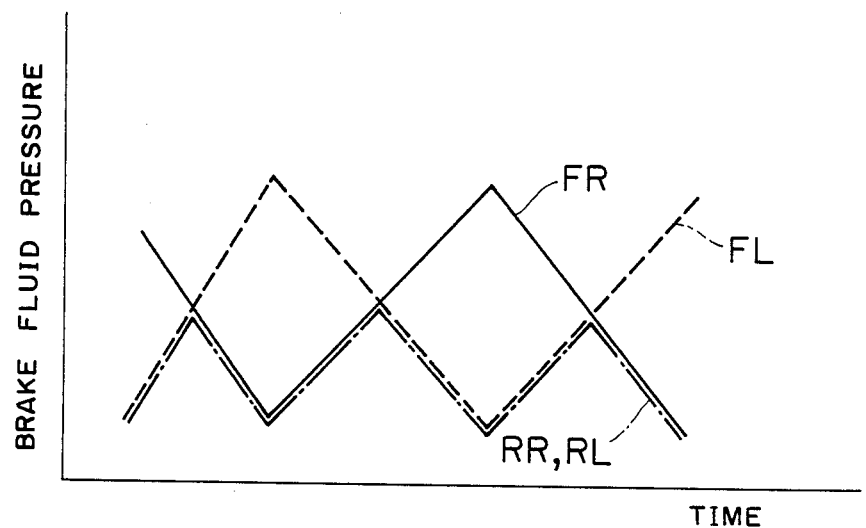
FIG. 4 is a graph showing the fluid pressure condition during the operation of the conventional device.

At the same time, the cut valve 7b moves to the left and comes into contact with the stepped valve seat 25b, thereby closing the passage to the RL, so that, in the FR-RL line, the brake fluid pressure of the RL is kept at a constant value (a-d in FIG. 2). Consequently, the RL brake fluid pressure is not reduced more than it needs, whereby a constant braking force can be secured. Since the fluid pressure supply to the FR has nothing to do with the movement of the cut valve 7a, pressurization on the FR is not hindered (a-c in FIG. 2).

When the danger of the wheel locking in the FL-RR line has been avoided thereafter, the hold valve 18b is opened and the decay valve 20b closed, then the pump 22b is operated, so that the brake fluid pressure in the FL-RR line is reincreased (b-e in FIG. 2).

When there is the danger of starting locking of either FR or RL in the FR-RL line (it would be natural here to expect the danger of starting locking of the RL since the friction coefficient μ is lower on the left-hand side of the road surface), a signal from the ECU causes the hold valve 18a to close and the decay valve 20a to open, the fluid pressure in the chamber 15a between the cut valve 7a and the partition wall 4a being relieved into the reservoir 21a. As a result, the fluid pressure of the FR is first reduced (c in FIG. 2), and thereafter, as soon as the fluid pressure of the FR has become equal to that of the RL, the check valve 27b is opened to reduce the fluid pressure of the RL (d in FIG. 2).

Since the cut valve 7a moves to the right and comes into contact with the stepped valve seat 25a to close the passage to the RL, the fluid pressure of the RR in the FL-RR line is kept at a constant value (e in FIG. 2). Accordingly, the brake fluid pressure of the RR is not reduced more than it needs, whereby a constant braking force is secured. Since the pressure fluid supply to the FL has nothing to do with the movement of the cut valve 7b, the pressurization of the FL is not hindered (e-g in FIG. 2). Suppose it is necessary to perform anti-lock control on the FR-RL line and the brake fluid pressures of the FR and the RL are to be reduced. If in this case the danger of the wheel locking is avoided before the fluid pressure of the FR has been reduced to the same level with the retained RL fluid pressure (the point d in FIG. 2), and consequently, there is no need for pressure reduction thereof, it is not necessary to reduce the brake fluid pressure of the RL. Consequently, the check valve 27b is not opened, which would reduce the fluid pressure of the RL.

The braking of the vehicle is effected by repeating the above operations. Next, suppose the FL-RR line has failed to function. In this case, no fluid pressure exists in the fluid pressure input chamber 8b on the right-hand side of the fail-safe piston 3, so that the fail-safe piston 3 moves to the right and abuts against the butting bar 13 of the cut valve 7b, thereby keeping the cut valve 7b in the open state. Accordingly, the fluid pressure of the FR and that of the RL are controlled irrespective to the open/close condition of the hold valve 18b and the decay valve 20b in the FL-RR line.

While in the above description the FL-R line and the FR-RL line are represented as to be alternately put in the pressure-reducing condition, the operation of the device is not to be construed as to be restricted to such. It goes without saying that both lines can be put in the pressure reducing state simultaneously.

If one brake line is subjected to anti-lock control and pressure reduction, the rear wheel fluid pressure in the other brake line is kept at a constant value, without following this pressure reduction, so that the braking force can be secured and the braking distance shortened.

Further, if one brake line has failed to operate, the cut valve in the other brake line is retained in the open state by the fail-safe control device, so that the normal braking of the rear wheel in the other brake line can be secured.

What is claimed is:

1. An anti-lock control device in a 2-channel diagonal brake system of the type in which the brake fluid pressure is individually supplied from a master cylinder to the FL-RR brake line for controlling the brake fluid pressure of the front left wheel and that of the rear right wheel and to the FR-RL brake line for controlling the brake fluid pressure of the front right wheel and that of the rear left wheel; said anti-lock control device comprising:
   reservoirs provided in both brake lines and adapted to effect pressure reduction in the brake fluid pressure from both the front wheel and the rear wheel of the brake line when there is a danger of locking of either the front or the rear wheel;
   cut valves provided in both brake lines, each of said cut valves functioning such that when one of the brake lines is subjected to anti-lock control to reduce the brake fluid pressure thereof, it retains the brake fluid pressure of the rear wheel in the other brake line at a fluid pressure corresponding to that at the time of said pressure reduction; and
   check valves provided in both brake lines, each of said check valves functioning such that when the other brake line is also subjected to anti-lock control to reduce the rear wheel brake fluid pressure retained by the cut valve in the other brake line, it serves to reduce the rear wheel brake fluid pressure.

2. An anti-lock control device in a 2-channel diagonal brake of the type in which the brake fluid pressure is individually supplied from a master cylinder to the FL-RR brake line for controlling the brake fluid pressure of the front left wheel and that of the rear right wheel and to the FR-RL brake line for controlling the brake fluid pressure of the front right wheel and that of the rear left wheel; said anti-lock control device comprising:
   reservoirs provided in both brake lines and adapted to effect pressure reduction in the brake fluid pressure from both the front wheel and the rear wheel of the brake line when there is the danger of locking of either the front or the rear wheel;
   cut valves provided in both brake lines, each of said cut valves functioning such that when one of the brake lines is subjected to anti-lock control to reduce the brake fluid pressure thereof, it retains the brake fluid pressure of the rear wheel in the other brake line at a fluid pressure corresponding to that at the time of said pressure reduction;
   check valves provided in both brake lines, each of said check valves functioning such that when the other brake line is also subjected to anti-lock control to reduce the rear wheel brake fluid pressure retained by the cut valve in the other brake line, it serves to reduce the rear wheel brake fluid pressure; and
   a fail-safe control device which functions such that when one of the brake lines fails to operate, it puts the cut valve in the other brake line in a normally open state.

3. An anti-lock control device as claimed in claim 1, wherein a control valve including a pair of cut valves is provided, said cut valves having respective first and second fluid passages passing through themselves and formed such that the respective second fluid passages are opened or closed;
   said master cylinder being connected through the first fluid passage of one of said cut valves to the front wheel cylinder of one of the brake lines, and, at the same time, being connected through the first fluid passage of said one cut valve and the second fluid passage of the other cut valve to the rear wheel cylinder in said one brake line, a first reservoir being connected through the first fluid passage of said one cut valve to the front wheel cylinder of said one brake line, and, at the same time, being connected through the first fluid passage of said one cut valve and the second fluid passage of the other cut valve to the rear wheel cylinder in said one brake line;
   said master cylinder being connected through the first fluid passage of the other cut valve t the front wheel cylinder in the other brake line, and, at the same time, being connected through the second fluid passage of the other cut valve and the second fluid passage of said one cut valve to the rear wheel cylinder in the other brake line, a second reservoir being connected through the first fluid passage of the other cut valve to the front wheel cylinder in the other brake line, and, at the same time, being connected through the first fluid passage of the other cut valve and the second fluid passage of said one cut valve to the rear wheel cylinder in the other brake line;
   said one cut valve closing the second fluid passage thereof when the first reservoir absorbs the brake fluid, and the other cut valve closing the second fluid passage thereof when the second reservoir absorbs the brake fluid; and
   check valves being provided in the respective second fluid passages of said cut valves, said check valves allowing the pressure fluid to flow from the side of the rear wheel cylinders to that of the master cylinder.

4. An anti-lock control device as claimed in claim 2, wherein a control valve is provided, said control valve having a pair of cut valves each arranged on either side of a fail-safe piston, a pair of fluid pressure input chambers being arranged on either side of said fail-safe piston, said cut valves having respective first and second fluid passages which pass through themselves and formed such that said second fluid passages are opened and closed, and further including butting bars adapted to abut against the fail-safe piston;
   said master cylinder being connected through one of said fluid pressure input chambers and the first fluid passage of one of said cut valves to the front wheel cylinder of one of the brake lines, and being further connected through the first fluid passage of said one cut valve and the second fluid passage of the other cut valve to the rear wheel cylinder of said one brake line, a first reservoir being connected through the first fluid passage of said one cut valve to the front wheel cylinder of said one brake line, and being further connected through the first fluid passage of said one cut valve to the rear wheel cylinder of the other cut valve;
   said master cylinder being further connected through the other fluid pressure input chamber and the first fluid passage of the other cut valve to the front wheel cylinder of the other brake line, and being further connected through the first fluid passage of the other cut valve and the second fluid passage of said one cut valve to the rear wheel cylinder of the other brake line, a second reservoir being connected through the first fluid passage of the other cut valve to the front wheel cylinder of the other brake line, and being further connected through the first fluid passage of the other cut valve and the second fluid passage of said one cut valve to the rear wheel cylinder of the other brake line;

said one cut valve closing the second fluid passage thereof when the brake fluid is absorbed by the first reservoir, and the other cut valve closing the second fluid passage thereof when the brake fluid is absorbed by the second reservoir; and check valves being provided in the respective second fluid passages of said cut valves, said check valves allowing the brake fluid to flow from the rear wheel cylinder side to the master cylinder side.

5. An anti-lock control device claimed in claim 1 wherein said cut valves consisting of stepped pistons which are moved by the fluid pressure in the respective second fluid passages as a result of pressure reduction in the respective first fluid passages at the time of anti-lock control, said stepped pistons being normally urged by respective springs toward the positions in which the respective second passages are opened.

6. An anti-lock control device claimed in claim 1 wherein a select-low line is adopted in which anti-lock control is performed on condition that at least either the front wheel or the rear wheel in each brake line threatens to star locking.

* * * * *